United States Patent [19]
Finney

[11] 4,162,929
[45] Jul. 31, 1979

[54] ENGINE MANIFOLD TEMPERATURE SENSING DEVICE

[75] Inventor: Philip F. Finney, Villa Park, Ill.

[73] Assignee: Thermo-Couple Products Company, Inc., Winfield, Ill.

[21] Appl. No.: 893,761

[22] Filed: Apr. 5, 1978

[51] Int. Cl.² .......................................... H01L 35/02
[52] U.S. Cl. .............................. 136/233; 73/343 R; 73/359 R; 136/230; 136/232; 136/235; 136/242
[58] Field of Search ............... 136/230, 232, 233, 235, 136/242; 73/343 R, 359 R

[56] References Cited

U.S. PATENT DOCUMENTS

| | | | |
|---|---|---|---|
| 2,611,791 | 9/1952 | Brandau | 136/235 |
| 3,376,169 | 4/1968 | Davis et al. | 136/230 |
| 3,913,058 | 10/1975 | Nishio et al. | 136/235 X |

*Primary Examiner*—Leland A. Sebastian
*Attorney, Agent, or Firm*—Lloyd L. Zickert

[57] ABSTRACT

A temperature sensing device for monitoring high temperature exhaust gases of an internal combustion engine which includes a sensing element and a support for the sensing element including a mounting stem, and electrical connection means secured to the end of the mounting stem which is outside of the manifold. A gas seal connection between the sensing element and the supporting mounting stem is located at a point removed from the hostile operating environment within the manifold and the fit between the sensing element and the mounting stem is such that a slight freedom of movement is available at the portion of the mounting stem innermost of the manifold to thereby shift the point of highest stress to the gas seal and securing connection between the mounting stem and the sensing element.

20 Claims, 20 Drawing Figures

ENGINE MANIFOLD TEMPERATURE SENSING DEVICE

This invention relates in general to a device for monitoring the temperature of moving high temperature gases in a duct, and more particularly to a device for sensing the temperature of high temperature gases in the exhaust of an internal combustion engine, and still more particularly to a thermocouple assembly of unique structure for mounting on a manifold of an engine.

It is well known that the life of an internal combustion engine, the maintenance costs and the fuel consumption are all related to the operational efficiency of the engine in that these factors are detrimentally affected where the operating efficiency of the engine is below its capacity. It is also known that there is a direct relationship between the temperature of the exhaust gases of an engine and the efficiency to which it is operating. For example, if the exhaust gas temperatures are above a certain level, the engine is overloaded and is operating inefficiently. Likewise, if the temperature of the exhaust gases is below a certain level, the engine is not properly loaded and is therefore operating inefficiently.

Newly developed control and indicating systems within the internal combustion engine industry have created a need for a reliable and inexpensive temperature sensing device which can be used to indicate to the operator the operational efficiency of an engine so that the most efficient operation can be obtained to enhance its life and to reduce maintenance costs and fuel consumption.

The problems encountered in providing a temperature sensing device for an internal combustion engine include conditions especially peculiar to reciprocating internal combustion engines, such as vibration, high temperatures and gas loading of an element in a manifold, as well as the outside environment where an engine is used. Heretofore, temperature sensing devices have been used for measuring exhaust gases in manifolds of engines but have met with premature failure and lack of reliability which defeats its purpose, thereby reducing engine life, increasing maintenance and fuel consumption, and in many cases resulting in total destruction of engines having considerable value. An example of such a sensing element is disclosed in U.S. Pat. No. 2,611,791, where the point of highest stress of the unit is located at the area where the element is rigid with the stem and where the gas seal is substantially fully exposed to the hostile environment of the exhaust gases.

The present invention overcomes the difficulties heretofore known in connection with a sensing device for determining the temperatures of exhaust gases for a reciprocating internal combustion engine by being of such rugged construction as to withstand vibration, the hostile environment of the exhaust gases including high temperatures, gas loading and contaminants, and the outside environment to which the output end of the sensing device is subjected. Further, the sensing device of the present invention is economical to make and includes a minimum number of parts.

It should be appreciated the sensing device of the present invention could be used wherever there is a need to monitor the temperature of moving gases in a duct, although it will be described herein particularly for monitoring exhaust gases of an engine.

More particularly, the temperature sensing device of the present invention includes a sheathed thermocouple sensing element received in a mounting stem and secured thereto by a gas seal at the output end of the unit, thereby removing the gas seal and securing means to the most remote location possible away from the hostile environment of the gases. The fit between the sensing element and the stem is such as to provide a freedom of movement which shifts the point of highest stress of the element to the gas seal connection and to also dampen vibration. A terminal structure is provided at one end of the stem and thermocouple element to facilitate the connection of conductors thereto which lead to a readout unit.

It is therefore an object of the present invention to provide a new and improved temperature sensing device for use in monitoring the temperature of high temperature moving gases in a duct, and more particularly to a sensing device for monitoring high temperature exhaust gases of a reciprocating internal combustion engine.

It is a further object of the present invention to provide a new and improved temperature sensing device especially useful for monitoring exhaust gas temperatures in reciprocating engines which is of such rugged construction as to withstand engine vibration, high temperatures and contaminants in the gases, high velocity gas loading and the outside environment to thereby enhance the long life of the device and whereby temperature monitoring allows the operator to utilize the engine at its near maximum efficiency to thereby prolong engine life and reduce maintenance costs and fuel consumption.

Another object of the present invention is to provide a temperature sensing device including a sensing element and support means therefor wherein the sensing element is effectively dampened under vibratory conditions and the point of highest stress between the sensing element and the support member is at a point removed from the hostile environment of the gases, and whereby likewise the gas seal between the sensing element and the support member is at a point removed from the hostile environment of the gases.

Other objects, features and advantages of the invention will be apparent from the following detailed disclosure, taken in conjunction with the accompanying sheets of drawings, wherein like reference numerals refer to like parts, in which.

The temperature sensing device of the present invention, while especially suited for measuring the temperature of exhaust gases for reciprocation internal combustion engines could be used to measure high temperature contaminating gases produced from a device other than an engine, especially where there is a need for withstanding vibration, the hostile environment of the gases and the exterior environment in which the overall device is to be utilized.

The sensing device is further especially useful for industrial diesel engines such as used on farm and highway tractors where a high level of vibration is encountered. The exhaust gases for such an engine reach extremely high temperatures in the range of 1400 degrees F. The sensor of the invention would be mounted in the exhaust manifold of the engine generally between the exhaust valves and the turbocharger. By monitoring the temperature of these gases, it can be determined whether the engine is operating near its maximum efficiency and particularly whether it is operating below or above the most efficient engine loading. The temperature of the gases will relate directly to the loading of the engine and when monitored by the operator will tell the operator whether to upshift or downshift the gearing in order to operate the engine most efficiently by bringing the loading into the most efficient range.

Figures 1, 2, 5:
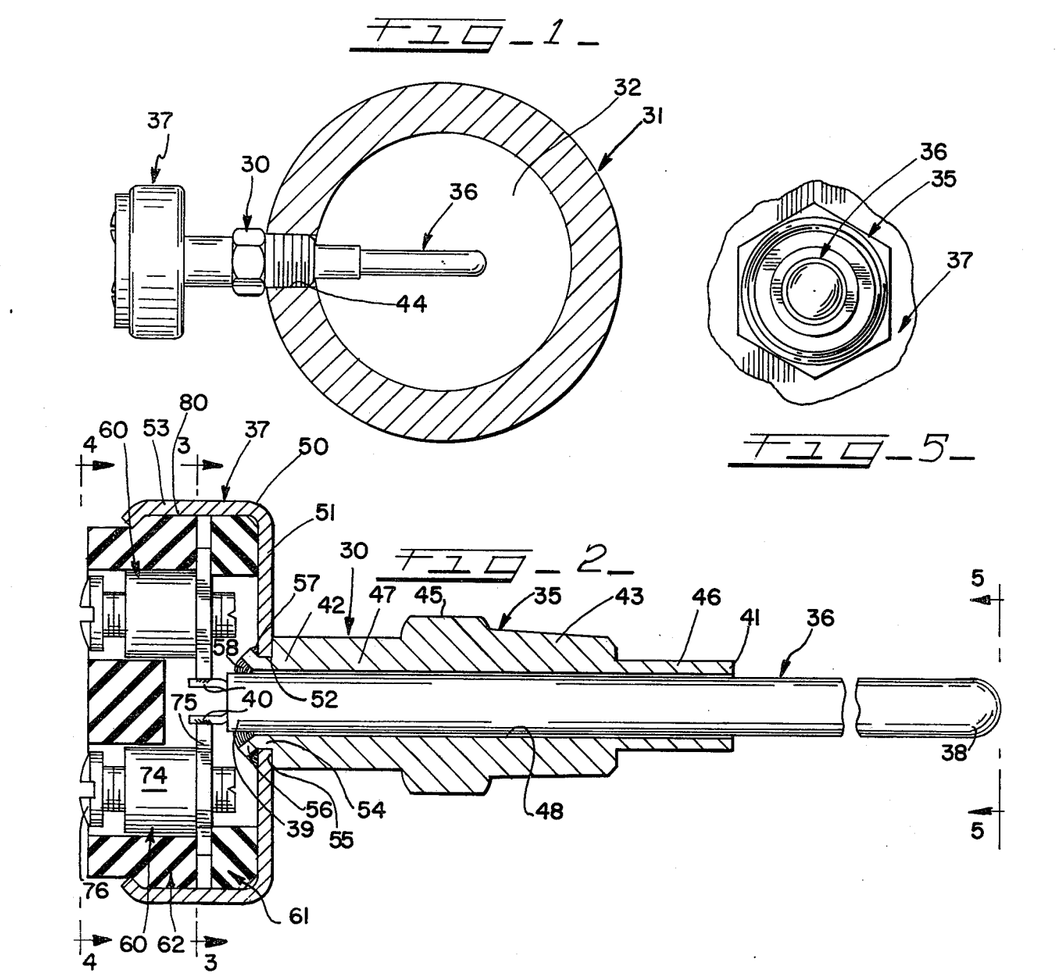
FIG. 1 is a sectional view taken through a duct such as an exhaust manifold of an engine and showing a side elevational view of a temperature sensing device according to the invention and illustrating how it may be mounted in the wall of an exhaust manifold.
FIG. 2 is a greatly enlarged longitudinal sectional view taken through the sensing device shown in FIG. 1 and showing an exaggerated clearance between the sensing element and the stem.
FIG. 5 is an opposite end elevational view of the device and taken substantially along line 5—5 of FIG. 2.
Figure 3:
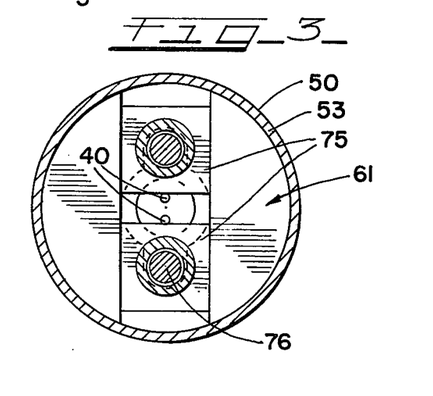
FIG. 3 is a sectional view taken substantially along line 3—3 of FIG. 2 to illustrate certain details of the device.

Referring now to the drawings and particularly to the embodiment illustrated in FIGS. 1 to 15, the temperature sensing device of the present invention, generally designated by the numeral 30, is illustrated in FIG. 1 as it would be used in that it is mounted in the wall of an exhaust manifold duct 31 to monitor the temperature of exhaust gases moving through the passageway 32 defined by the duct. While the illustration of FIG. 1 is a typical illustration, it should be appreciated that the sensing device is particularly adapted for mountability in the wall of any duct.

The temperature sensing device 30 includes generally a mounting stem 35, a thermocouple sensing element 36, and a terminal head 37. It is the support for the sensing element 36 that is so important in the present invention to the life of the sensing device, and it is the terminal head 37 that contributes to the ease for connecting the sensing device to a readout apparatus. It can be appreciated that the readout apparatus may be of any suitable type and that it does not constitute a part of the present invention, and further that it would be calibrated in accordance with the structure of the sensing element 36.

The sheath-type thermocouple sensing element 36 is of a type that is commercially available in that it would be constructed of the usual materials and have a junction end 38 and an output end 39 from which would extend a pair of leads or conductors 40 that would be joined together at the junction end 38 of the element. The thermocouple conductors 40 are insulated from each other and from the case by a suitable insulation such as magnesium oxide, and the element would be of any desired type such as iron-constantan, chromel alumel, copper-constantan, or any other suitable combination of conductors, as long as it is capable of withstanding high temperatures in the 1400 degree F. range. Of course, it can be appreciated that the design of the thermocouple sensing element will depend upon the range of temperatures to be monitored. The length of the sensing element will be such that it extends from the inner end 41 of the mounting stem 35 a sufficient distance to place the tip end of the element at a desired location within the duct and also to extend slightly outward from the outer end 42 of the mounting stem, as particularly illustrated in FIGS. 1 and 2.

The mounting stem 35 further includes a threaded section 43 adapted to threadedly engage a threaded opening 44 formed in the wall of the duct 31. The fit between the threaded portions is such as to obtain a complete seal and prevent the escape of any gases between the mounting stem and the duct. Toward the outer end 42 from the threaded section 43 a nut-formed or hexagonally formed section 45 is provided to which a tool may be applied for mounting of the device to the duct. Forward or inward of the threaded section 43 a thin wall extension 46 is provided while rearward or outwardly of the nut portion 45 a thicker walled extension 47 is provided. A central hole or bore 48 is provided through the entire mounting stem and for receiving the sensing element 36. A clearance between the exterior surface of the sensing element 36 and the central hole 48 is provided and shown in FIG. 2 in an exaggerated manner for a purpose that will be explained hereafter.

At the rear or outer end of the mounting stem 35 a bell or cup-shaped terminal block base 50 is mounted for housing a terminal structure that enables electrical connection of the sensing element to a monitoring unit. The cup-shaped block 50 includes a circularly shaped bottom or end wall 51 having a central hole 52 extending therethrough and a wall 53 extending circumferentially back from the periphery of the wall 51. The terminal block base 50 fits over a necked-down extension 54 of the mounting stem 35 to bear against a shoulder 55. The outer end of the necked-down extension 54 is flared at 56 to initially hold the terminal block base 50 in place on the mounting stem. Thereafter, brazing or welding is applied between the flared portion 56 and the wall 51 at 57 to permanently fasten the terminal block base to the mounting stem. The brazing 57 would be annularly applied between the mounting stem and the terminal block base although it can be appreciated that it could be applied only in certain areas.

At the time the brazing is applied to the mounting stem and the terminal block base, it is also applied between the mounting stem and the sheathed thermocouple sensing element 36 at 58. The brazing here serves as a gas seal between the sensing element and the mounting stem to prevent leakage of gases from the duct 31 and also to secure the sensing element in place relative to the mounting stem. It can be appreciated here that the brazed joint between the sensing element and the mounting stem is positioned outside the duct and located remotely from the hostile environment of the gases in the duct 31. By being outside the duct the operating temperature at the brazed joint is substantially less than the operating temperature at the junction end 38 of the thermocouple sensing element by virtue of the end of the device at the terminal head being subjected to the environment of the outside where normally it would be at a temperature substantially less than that which would be encountered within the duct. As an example, where the temperature of the gases in the duct would reach about 1400 degrees F., it would normally be about 300 degrees F. at the brazed joint.

It is well known that the strength of a brazed joint is reduced when subjected to high temperature conditions. Further, exposure of the brazed joint to contaminants in the gases together with a high temperature situation is detrimental to the joint. Accordingly, it is important to minimize the exposure of the brazed joint to high temperature conditions and to contaminants. It is also known that the effect of the contaminants is related to the temperature and the effect will be greater with a high temperature condition. While the bases can reach the brazed joint by virtue of the clearance between the sensing element and the opening through the mounting stem, the gases at the brazed joint are at a low temperature and very little exchange can take place, which thereby minimizes the exposure of the brazed joint to the contaminants of the gases.

The amount of clearance or tolerance between the outer surface of the thermocouple sensing element 36 and the central hole 48 through the stem 35 is determined by the factor of brazing the output end of the element to the stem and the factor that the point of highest stress along the element is desired to be away from the area at the inner end 41 of the stem. The clearance allows a freedom of movement between the element and the stem but restricts that movement within certain limits. If the element had no clearance with respect to the stem and therefore a solid connection would exist between the stem and element, the point of highest stress along the element would be at the outer end 41 of the stem, and the vulnerability of the element to higher frequencies would be increased. In the event the clearance between the element and the stem were too small, the capillary action of the brazing when it is applied would possibly be such that the entire clearance area would be filled. It is therefore desired to have the largest possible clearance in order to restrict the capillary action and flow of the brazing material so that the brazed connection is maintained primarily at the output end of the element and closely adjacent to the outer end 42 of the stem. Accordingly, an accepted tolerance would be 0.005 inches diametral clearance or 0.0025 radial clearance.

The sensing element 36, as seen in FIG. 1, is suspended in the hot gas stream at a position substantially perpendicular to the gas stream and wherein the tip end of the element where the junction is located is approximately two-thirds the distance across the diameter of the duct at a point where the most accurate measurement of the gases through the center can be measured. The gas stream of a running engine pulsates and changes with engine speed. Engine operation also causes vibration of the manifold which likewise changes with engine speed. Excitation of the sensing element which is cantileverly supported in the exhaust gas stream is thereby caused by the gas stream loading of the element and/or the manifold vibration.

Since the entire manifold vibrates, it is therefore desired to have an element which is as long as possible in order to avoid the high frequencies so that it will have the longest possible life. Exemplary of the size of parts where the length of the element is 3.120 inches from end to end the dimension between the tip end of the element plus the thin wall extension 46 would be two inches, while the length of the stem 35 less the extension 46 and to the wall of the terminal base block would be one inch and where the diameter of the thermocouple element would be 0.190 inches. Further, the unsupported portion of the sensing element, i.e., the portion from the end 41 of the stem to the free end of the element, would be 0.900 inches. For shorter length sensing elements the length of the extension 46 would be suitably decreased. It is desired to distribute the stress over the length of the stem within which the element is mounted. If there were no freedom between the sensing element 36 and the stem 35, the point of highest stress of the sensing element would be at the end 41 of the stem as is the case in heretofore known sensing devices.

The leads of thermocouple conductors 40 are suitably connected to terminal posts 60 which are locked in place within the terminal base block 37 by means of a lower terminal block 61 and an upper terminal block 62. The terminal posts are made of a suitable electrically conducting material, and may be of stainless steel, while the terminal blocks 61 and 62 are made from ceramic or an otherwise suitable electrically insulating material.

The outer diameter of the lower terminal block 61 is sized to easily fit within the terminal block base 37 and against the end wall 51, as seen particularly in FIG. 2. The structure of the lower terminal block 61 is shown in detail in FIGS. 8, 9 and 10 in perspective in FIG. 6, wherein a keyhole-like opening 65 is provided centrally through the block to accommodate the innermost ends of the terminal post 60 and the assembly operations for effecting the brazing of the mounting stem to the sensing element and to the terminal block base. The innermost face 66 of the block is planar, while the outermost face 67 includes a diametrically extending depression or groove 68 which embraces the keyhole opening 65 and which receives a part of the terminal posts 60 as will be more clearly hereinafter described. An axially extending notch 69 is formed in the periphery of the block for coaction with an axially extending indentaion 70 formed in the annular wall 53 of the cup-shaped terminal base block 50. Mating of the notch with the indentation prevents relative rotation between the members and ultimately relative rotation between the upper terminal block and terminal posts relative the cup-shaped terminal block base 50.

Each terminal post 60 includes a cylindrically shaped body 64 having a square or rectangularly formed flange 75 at the end adjacent the output end of the thermocouple sensing element. The flange 75 is sized to fit within the groove 68 of the lower terminal block 61 to thereby prevent relative rotation between the terminal posts and the block. Further, the thermocouple conductor leads 40 are suitably secured to the flanges 75 such as by soldering. Completing the structure of the terminal posts are machine screws 76 which are threadedly received within the threaded bores in the terminal posts and which facilitate the easy connection of wires to the posts, which wires would go to a monitor.

The upper terminal block 62, when placed within the terminal block base 50, abuts against the lower terminal block as well as a part of the flanges 75 of the terminal posts to hold the flanges of the terminal posts in the groove or slot 68 of the lower terminal block 61. Details of the upper terminal block 62 are shown in FIGS. 11 to 15.

Figure 4:
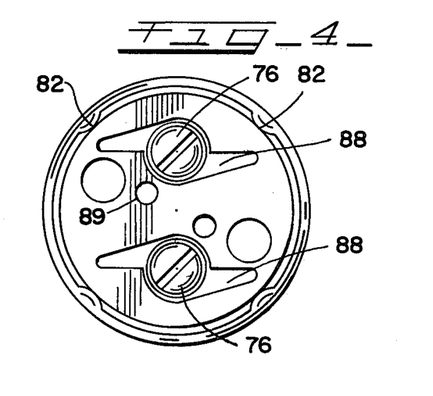
FIG. 4 is an end elevational view of the device and taken substantially along line 4—4 of FIG. 2.

The upper terminal block 62 is cylindrical like the lower terminal block 61 and includes an outer peripheral wall having stepped portions 79 and 80 defining a step or shoulder 81. It can be seen in FIG. 2 that the stepped portion or surface 79 is of the same size diametrically as the outer peripheral surface of the lower terminal block 61 and is sized to fit into the open end of the terminal block base 50. The step between the surface 79 and the surface 80 serves to allow the free edge of the terminal block base circumferential wall 53 to be crimped thereover at any desired number of points such as points 82, as seen in FIG. 4, so that the terminal blocks and the terminal posts can be retained within the terminal block base. While a notch 83 is provided in the outer stepped portion 79 of the upper terminal block, it does not function during the assembly of the terminal head inasmuch as the indentation 70 in the terminal block base wall 53 does not extend into the area where the upper terminal block is received. However, if it were deemed necessary in order to restrict relative rotation between the upper terminal block and the terminal block base, it can be appreciated that the indentation could be extended to coact with the notch 83. Under normal circumstances the interlocking of the terminal posts 60 with the upper and lower terminal blocks and the restriction against relative rotation of the lower terminal block will be adequate to restrict movement of the terminal blocks and terminal posts.

Terminal post holes 84 are provided through the upper terminal block 62 for receiving the cylindrically shaped body 74 of the terminal posts. At the end of the upper terminal block which faces the lower terminal block the end wall 85 will engage against a part of the terminal post flanges 75 and the outermost face 67 of the lower terminal block 61. As seen collectively in FIGS. 11 and 13, a slot or recess 86 is also provided in the end wall 85 which extends between the terminal post holes 84 to provide sufficient clearance for the ends of the thermocouple sensing element conductor leads 40, as seen particularly in FIG. 2. The opposite end wall 87 of the upper terminal block is additionally provided with generally V-shaped conductor recesses or slots 88 which extend from the terminal post holes 84, as can be seen more particularly in FIGS. 12, 14 and 15, and which are of a depth to facilitate the connection of conductors to the terminal posts at the binding level thereof, as can be appreciated in FIG. 2. The slots have a depth generally equal to the binding level of the posts. Additional shallow recesses 89 are provided in the end wall 87 for receiving indicia concerning polarity and type of thermocouple conductor materials.

Figure 6:
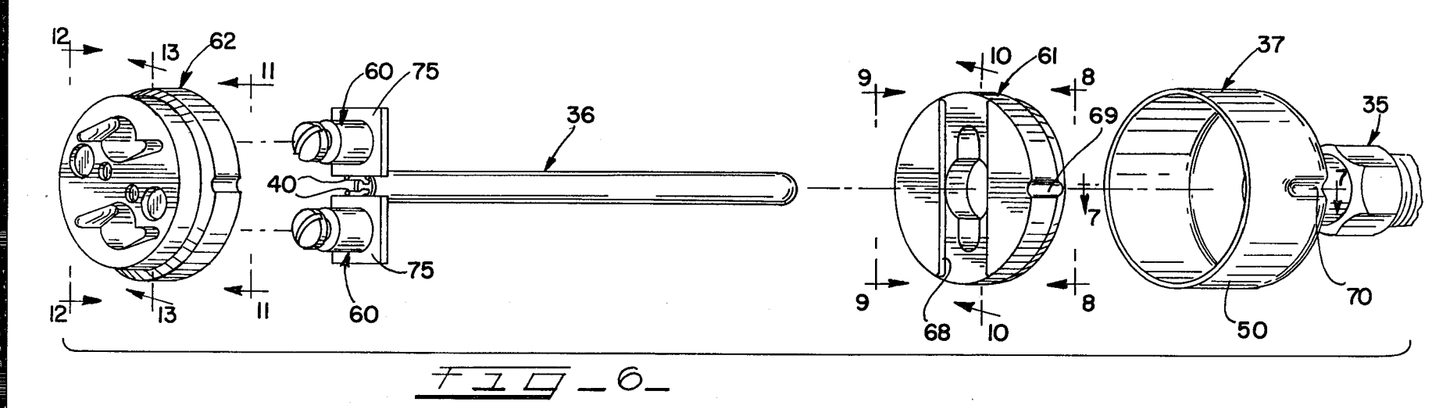
FIG. 6 is an exploded view of the sensing device of FIG. 2 showing various parts in perspective.
Figure 7:
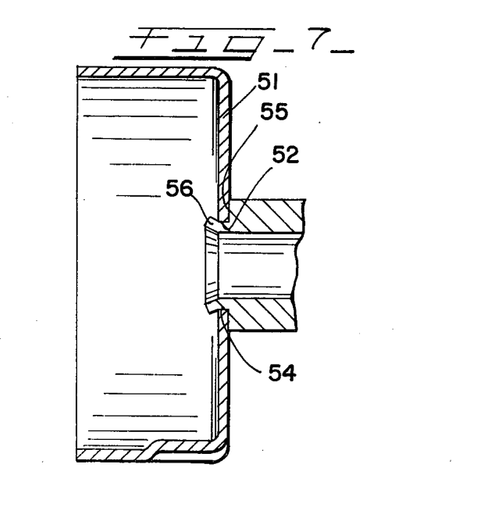
FIG. 7 is a sectional view taken through the terminal block base and taken substantially along line 7—7 of FIG. 6.
Figure 8:
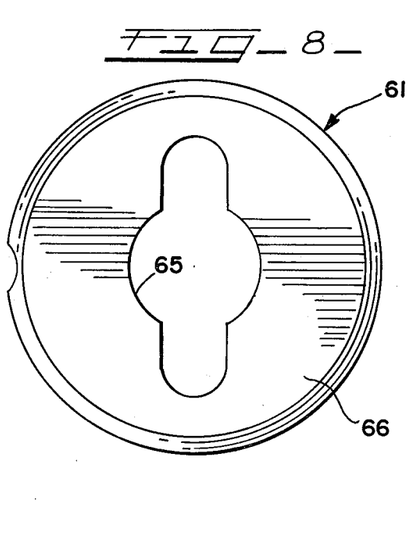
FIG. 8 is a plan view of the lower terminal block and taken along line 8—8 of FIG. 6.
Figure 9:
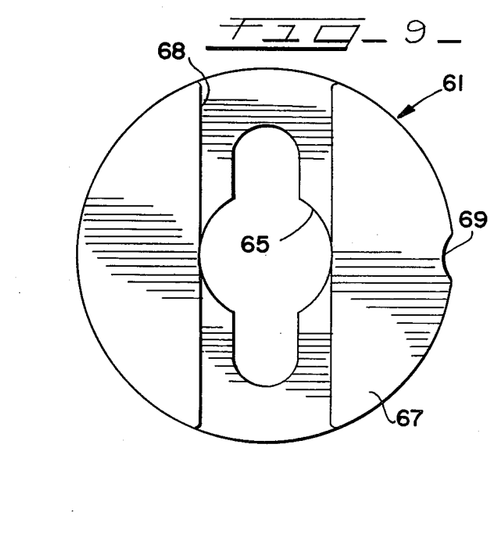
FIG. 9 is an opposite plan view of the lower terminal block and taken along line 9—9 of FIG. 6.
Figure 10:
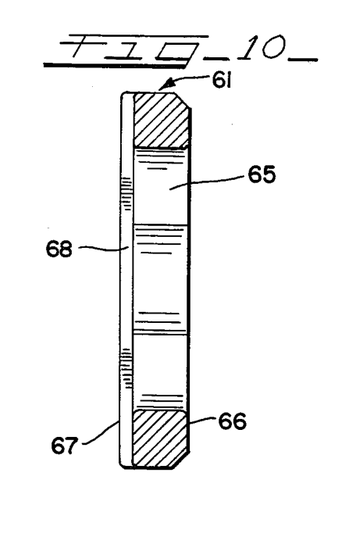
FIG. 10 is a transverse sectional view taken along line 10—10 of FIG. 6 of the lower terminal block.
Figure 11:
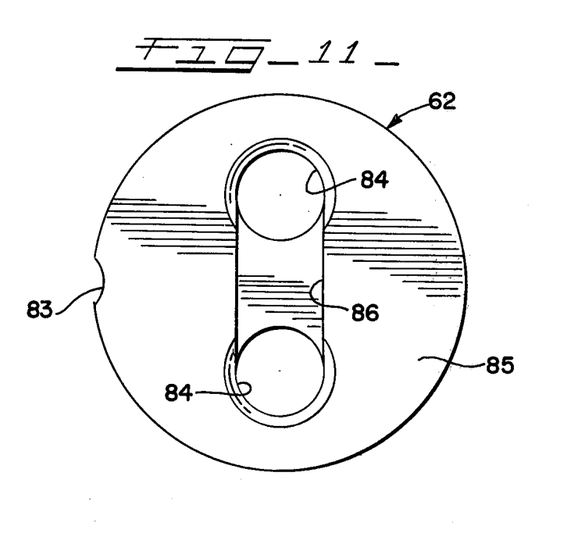
FIG. 11 is a plan view of the upper terminal block and taken substantially along line 11—11 of FIG. 6.
Figure 12:
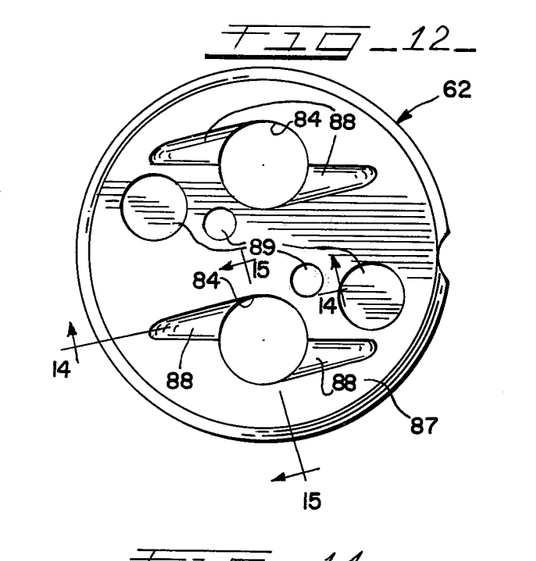
FIG. 12 is a plan view opposite to that of FIG. 11 and taken substantially along line 12—12 of FIG. 6.
Figure 13:
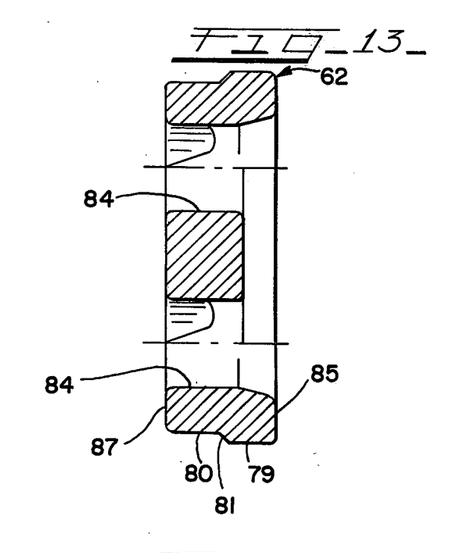
FIG. 13 is a transverse sectional view of the upper terminal block and taken substantially along line 13—13 of FIG. 6.
Figure 14:
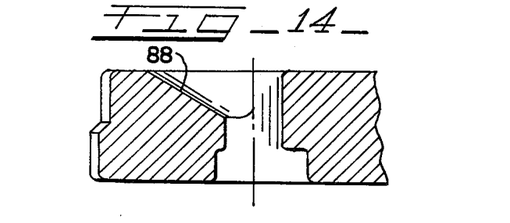
FIG. 14 is a detailed sectional view of the lower terminal block taken substantially along line 14—14 of FIG. 12.
Figure 15:
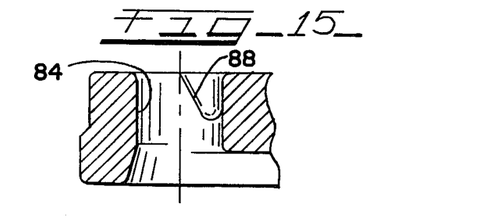
FIG. 15 is a detailed sectional view of the upper terminal block and taken substantially along line 15—15 of FIG. 12.

The assembly of the embodiment of FIGS. 1 to 15 can be appreciated by referring to FIGS. 2 and 6. The thermocouple element in sheath form, generally identified by the numeral 36, is first arranged with respect to its leads 40 in association with terminal posts 60 such that the leads 40 can be suitably fastened to an edge of the terminal post flanges 75 by soldering or the like, as shown in FIG. 6. The mounting stem 35 is placed in association with the cup-shaped terminal block base or holder 37 such that the necked-down extension 54 extends through the hole 52 until the shoulder 55 abuts against the end wall 53, after which the extension 54 is flared at 56 to hold the parts together. Thereafter, the lower terminal block 61 is inserted into the terminal block base 37 and oriented so that the notch 69 meshes with the indentation 70. Following this step the subassembly of the sensing element 36 and terminal post 60 are brought together with the mounting stem 35 and the lower terminal block 61 such that the square flanges 75 of the terminal posts set into the recess 68 in the lower terminal block 61. With the sensing element and terminal posts in position, brazing of the mounting stem to the terminal block base and the mounting stem to the outer metal sheath of the sensing element 36, as indicated by 57 and 58 in FIG. 2, is accomplished in order to secure the terminal block base to the mounting stem and to define the gas seal between the sensing element and the mounting stem and also to connect the sensing element to the mounting stem. Preferably, a thin flowing brazing material is employed. Following the step of brazing, the upper terminal block 62 is inserted into the terminal block base such that the terminal posts are received in the terminal post holes and the upper terminal block abuts against the lower terminal block and a portion of the terminal post flanges, after which the free edge of the terminal block base circumferential wall 50 is crimped, as shown in FIGS. 2 and 4, in order to retain the parts in assembled relation and particularly to especially retain the upper terminal block in position against the lower terminal block. By virtue of the engagement of the notch 69 of the lower terminal block with the indentation 70 and the interlocking of the terminal posts between the upper and lower terminal blocks, all of the parts within the terminal block base are inhibited against relative rotation therewith. It will be appreciated the terminal blocks electrically insulate the terminal posts from each other and from the metal terminal block base and the metal mounting stem.

Figure 16:
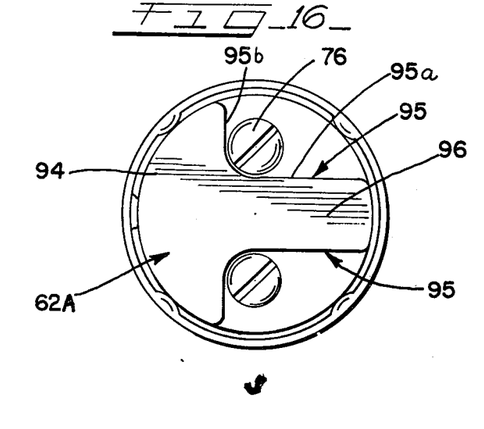
FIG. 16 is an end elevational view of a modified terminal arrangement for the sensing device of the invention.
Figure 17:
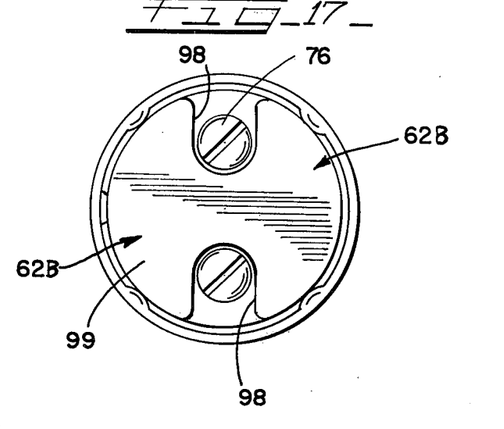
FIG. 17 is an end elevational view of a still further modified terminal arrangement for the sensing device of the invention.
Figure 18:
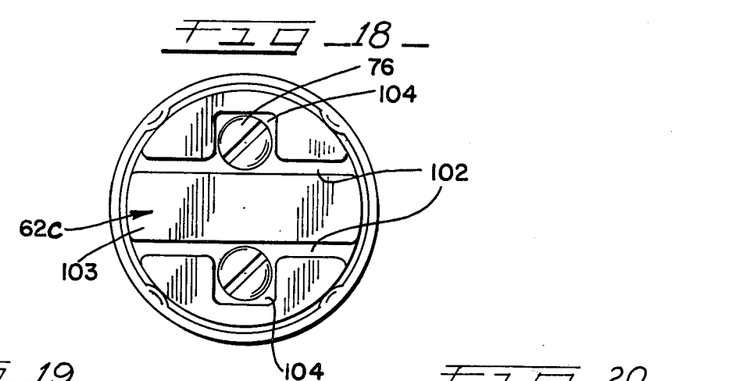
FIG. 18 is a still further modified terminal arrangement for the sensing device of the invention.

The embodiments of FIGS. 16, 17 and 18 differ from the embodiment of FIGS. 1 to 15 only in that the outermost surface of the upper terminal block is provided with conductor recesses of another shape. The upper terminal block 62A of the embodiment of FIG. 16 is provided with an outer end wall 94 having conductor recesses 95 which extend from the periphery of the wall inwardly and around the machine screws 76 of the terminal posts. The recesses are defined by a vertical wall 95a extending from the periphery inwardly and merging with a second vertical wall 95b which is at right angles to the wall 95a and which also extends to the periphery. Thus, access for connecting a conductor to a terminal post may be easily provided, while a center section 96 would serve to completely insulate the two conductors from each other.

The upper terminal block 62B of the embodiment of FIG. 17 includes conductor recesses 98 in the end wall 99 which are U-shaped in configuration, as viewed in FIG. 17, in association with the machine screws 76 of the terminal posts. The cavities or recesses 98 are diametrically opposed to each other along a diameter and open to the outer periphery of the terminal block.

The upper terminal block 62C of the embodiment of FIG. 18 includes a slot or channel 102 associated with each machine screw 76 of the terminal posts, which slot extends along a chord across the end wall 103. Additionally, recesses 104 are provided around the machine screws which merge with the channels 102 and coact to provide an area where a conductor may be connected to the terminal posts from either side of the upper terminal block. As in the other embodiments, the recesses and slots extend to the binding level of the posts.

Figure 19:
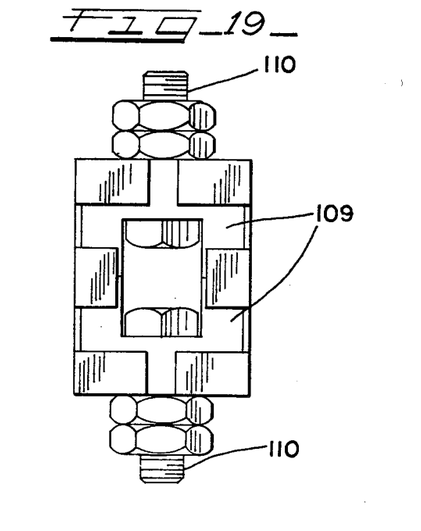
FIG. 19 is a still further modification of the invention and particularly of the terminal arrangement and taken as an end elevational view.
Figure 20:
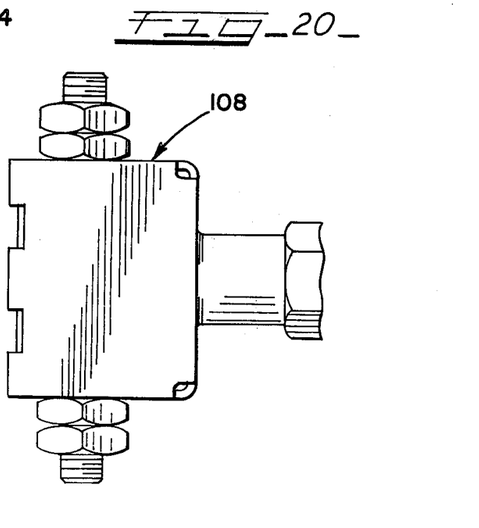
FIG. 20 is a side elevational view of the embodiment of FIG. 19.

The embodiment of FIGS. 19 and 20 differs from the other embodiments in the construction of the terminal head and for the purpose of allowing connection of conductors to the unit from opposite sides of the terminal head rather than at the terminal head. In this respect the terminal head, generally indicated by the numeral 108, is box-shaped and which would receive instead of upper and lower terminal blocks side-by-side ceramic terminal blocks 109 of identical configuration but placed opposite to one another and which would include holes for terminal posts 110 that would be in the form of machine screws and nuts which would extend through the holes of the terminal blocks. This embodiment would be otherwise constructed like the other embodiments illustrated as far as the support of the thermocouple sensing element is concerned and the connection of the thermocouple sensing element and mounting stem to the terminal block base of the terminal head. Thus, it can be appreciated that this embodiment would enable the connection of conductor terminals at the sides of the terminal head on each of the terminal posts 110. Assembly of this embodiment would approximate the assembly of the previously illustrated embodiments at least insofar as the connection of the mounting stem with the terminal block base and the gas seal connection of the thermocouple element to the mounting stem. Thereafter, the terminal posts would be assembled with the terminal blocks which would in turn be assembled with the terminal head, and the connection of the sensing element leads to the posts would be made.

It will be understood that modifications and variations may be effected without departing from the scope of the novel concepts of the present invention, but it is understood that this application is to be limited only by the scope of the appended claims.

The invention is hereby claimed as follows:

1. In a temperature sensing device for monitoring the temperature of moving gases in a duct including a sheathed thermocouple sensing element having a junction end and an output end and a pair of leads at the output end and means for supporting the element to mount same in a wall of the duct, the improvement in the means for supporting the element which comprises a mounting stem adapted to be fitted in an opening in the duct wall and to extend both within the duct and outside the duct, and having a central opening therethrough for receiving the element, said element extending within the duct beyond the inner end of the stem a sufficient amount to fully expose the junction end to the flow of gases within the duct and extending slightly beyond the outer end of the stem, a gas seal at the output end of the element to seal between the element and the stem to prevent gas flow therebetween and to secure the element to the stem, said gas seal being a brazed or welded connection between the peripheries of the element and the stem, the fit between the element and the stem being such that a clearance is provided to allow some freedom of movement between the junction end of the thermocouple and the inner end of the stem so that the point of highest stress of the element is at the gas seal and to provide effective damping to the element under vibratory conditions, and terminal means for providing electrical connection to the element leads.

2. The improvement defined in claim 1, wherein said terminal means includes conductor receiving means and support means supporting same in electrical insulating relationship to said mounting stem.

3. The improvement defined in claim 2, wherein said conductor receiving means includes terminal posts and said support means includes electrically insulating terminal block means.

4. The improvement defined in claim 3, wherein said terminal block means includes upper and lower terminal blocks having recesses for receiving the terminal posts and together holding the posts in position.

5. The improvement defined in claim 4, wherein said terminal means further includes a cup-shaped terminal block base which receives the terminal blocks and retains same in assembled relation, and means is provided for securing the base to the mounting stem.

6. The improvement defined in claim 5, wherein said terminal posts have a binding level recessed from the outer face of the outermost terminal block and conductor grooves are formed into said outer face to the binding level to facilitate insulating the conductor ends from each other and from the surrounding environment.

7. The improvement defined in claim 4, wherein said terminal posts include flange portions received by said blocks to prevent relative rotation therebetween.

8. The improvement defined in claim 7, wherein said terminal means further includes a cup-shaped terminal block base which receives the terminal blocks and retains same in assembled relation, and means is provided for securing the base to the mounting stem, and wherein means is provided on said terminal block means coacting with means on said base to prevent relative rotation therebetween.

9. The improvement defined in claim 8, wherein said means on said terminal block means coacting with said means of said base includes indent-detent structures.

10. The improvement defined in claim 6, wherein said conductor grooves are formed such that conductor ends may enter from one side or a point 180 degrees therefrom or alternately from opposing sides of the terminal block.

11. The improvement defined in claim 6, wherein said conductor grooves are V-shaped leading from the outermost surface of the terminal block to the binding level of the terminal posts.

12. The improvement defined in claim 3, wherein said block means are cylindrical and the terminal posts are at the end thereof.

13. The improvement defined in claim 3, wherein said block means are box-shaped and the terminal posts are on opposite sides thereof.

14. The improvement defined in claim 5, wherein said terminal blocks are generally cylindrical and stacked together one on another and the terminal posts are held in place by the blocks in side-by-side relation and exposed through the outermost block for attachment thereto of conductors.

15. The improvement defined in claim 14, wherein means is provided on at least one of said blocks and the base to prevent relative rotation therebetween.

16. In a temperature sensing device for monitoring the temperature of high temperature moving gases in a duct subjected to substantial vibration, wherein the device includes a metal sheathed thermocouple sensing element having a junction end and an output end and leads at the output end and means for supporting the element to mount same in a wall of the duct, the improvement in the means for supporting the element which comprises a mounting stem adapted to extend through the duct wall and fit therewith in sealed relationship, said stem having a central hole therethrough for receiving the element, means securing the output end of the element to the stem and to define a gas seal, said means including a brazed or welded connection between the peripheries of the element and the stem, said element and stem hole being sized to define a clearance to allow some freedom of movement therebetween, and terminal means at the output end of the element for providing connection of the element to a monitor.

17. The improvement defined in claim 16, wherein said terminal means includes a terminal block base of cup shape including a bottom wall and a circumferential wall, an opening in the bottom wall for receiving said stem and allowing the element leads to extend thereinto, a pair of disc-shaped electrical insulating blocks received within said base, terminal posts connected to said element leads and supported in spaced relation by said blocks, and means for retaining said blocks in place.

18. The improvement defined in claim 17, wherein said terminal block base and said insulating blocks include means to prevent relative rotation therebetween.

19. The improvement defined in claim 16, wherein said terminal means includes a box-shaped terminal block base including a bottom wall and two side walls, an opening in the bottom wall for receiving said stem and allowing the element leads to extend thereinto, a pair of electrical insulating blocks received within said base, and terminal posts extending through said blocks for connection to conductors at opposite sides of the base.

20. A temperature sensing device for sensing the temperature of the exhaust gases of an internal combustion engine and adapted to be mounted in the exhaust manifold of the engine which device comprises, a mounting stem for engaging into a fitting of the exhaust manifold, said stem having an opening therethrough and having portions projecting within the manifold and outside of the manifold, a thermocouple sensing element received within the opening of the stem, said sensing element extending outward of the inner free end of the stem and into the passage of the manifold and extending slightly outward of the outer end of the stem and having a clearance with the stem such that a freedom of movement is available at the point between the outer free end of the stem and the sensing element, a cup-shaped terminal block base at the end of the stem outside of the manifold, means securing the terminal block base to the stem, gas seal means between the thermocouple sensing element and the stem at the area of the terminal block base, a lower terminal block of ceramic within the terminal block base, an upper terminal block in the terminal block base abutting against the lower terminal block, terminal posts retained by said terminal blocks and electrically connected to the sensing element, and means on the terminal block base retaining the terminal blocks within the base.

* * * * *